United States Patent
Keusch et al.

(10) Patent No.: US 6,575,868 B1
(45) Date of Patent: Jun. 10, 2003

(54) TRANSAXLE WITH DIFFERENTIAL LOCK MECHANISM

(75) Inventors: Rene Keusch, Muri (CH); Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 09/550,043

(22) Filed: Apr. 14, 2000

(51) Int. Cl.$^7$ ............................................. F16H 48/06
(52) U.S. Cl. ........................................ 475/249; 475/231
(58) Field of Search ................................. 475/269, 339, 475/89, 86, 231, 234, 250, 249; 192/3.52; 75/473.373

(56) References Cited

U.S. PATENT DOCUMENTS

| | | | |
|---|---|---|---|
| 1,446,545 A | 2/1923 | Brush et al. | |
| 1,680,134 A | * 8/1928 | Dennison | 475/84 |
| 1,690,189 A | * 11/1928 | Dennison | 475/231 |
| 1,691,230 A | * 11/1928 | Dennison | 475/86 |
| 1,983,841 A | 12/1934 | Drexler | 192/48 |
| 2,209,966 A | 8/1940 | Goeller | |
| 2,566,601 A | 9/1951 | Cousins | |
| 2,771,791 A | 11/1956 | Bachman | |
| 2,774,253 A | 12/1956 | Minard et al. | |
| 2,785,369 A | 3/1957 | Ligh | |
| 2,985,035 A | 5/1961 | Toth | |
| 3,029,661 A | 4/1962 | Schmitter | |
| 3,090,253 A | 5/1963 | Linsley et al. | |
| 3,215,000 A | * 11/1965 | Senkowski et al. | 475/231 |
| 3,264,900 A | 8/1966 | Hartupee | |
| 3,528,323 A | 9/1970 | Kamlukin | |
| 3,811,342 A | * 5/1974 | Barthel | 475/269 |
| 3,871,249 A | * 3/1975 | Jeffers | 475/250 |
| 3,915,032 A | 10/1975 | Ottemann | |
| 3,916,728 A | 11/1975 | Behar et al. | |
| 4,050,534 A | 9/1977 | Nelson et al. | |
| 4,077,279 A | 3/1978 | Goscenski, Jr. | |
| 4,227,427 A | 10/1980 | Dick | 74/467 |
| 4,238,013 A | 12/1980 | Goscenski, Jr. | |
| 4,244,241 A | 1/1981 | Treadwell | |
| 4,271,722 A | * 6/1981 | Campbell | 74/713 |
| 4,280,375 A | 7/1981 | Goscenski, Jr. | |
| 4,290,321 A | 9/1981 | Wilson | |
| 4,294,218 A | 10/1981 | King et al. | |
| 4,389,909 A | 6/1983 | Goscenski, Jr. | |
| 4,480,501 A | 11/1984 | von Xaler | |
| 4,524,856 A | 6/1985 | Renaud | 192/98 |
| 4,696,164 A | 9/1987 | Giere | |
| 4,781,259 A | 11/1988 | Yamaoka et al. | |
| 4,834,319 A | 5/1989 | Ewy et al. | |
| 4,838,118 A | 6/1989 | Binkley | |
| 4,862,767 A | 9/1989 | Hauser | |
| 4,867,008 A | 9/1989 | Yamaoka et al. | |
| 4,907,470 A | 3/1990 | Kasemeier et al. | |
| 4,930,367 A | 6/1990 | Nagasawa | |
| 4,938,738 A | * 7/1990 | Fuelberth et al. | 475/317 |
| 4,959,043 A | 9/1990 | Klotz et al. | |
| 4,973,296 A | 11/1990 | Shibahata | |
| 4,979,582 A | 12/1990 | Forster | |
| 5,007,886 A | 4/1991 | Holmquist et al. | |
| 5,019,021 A | 5/1991 | Janson | |
| 5,055,095 A | 10/1991 | Osenbaugh et al. | |
| 5,092,825 A | 3/1992 | Goscenski, Jr. et al. | |
| 5,156,576 A | 10/1992 | Johnson | |

(List continued on next page.)

Primary Examiner—Sherry Estremsky
Assistant Examiner—Roger Pang
(74) Attorney, Agent, or Firm—Altheimer & Gray

(57) ABSTRACT

An integrated hydrostatic transaxle including a housing in which a center section is supported. The center section supports a hydraulic pump unit and a hydraulic motor unit having a motor shaft drivingly connected thereto. A gear differential assembly is drivingly linked to the motor shaft and is used to drive a pair of axle shafts, which are supported by the housing. The differential assembly includes a mechanism to prevent relative motion of the axle shafts with respect to each other, known as a differential lock mechanism.

30 Claims, 19 Drawing Sheets

U.S. PATENT DOCUMENTS

| | | | |
|---|---|---|---|
| 5,183,446 A | | 2/1993 | Hughes |
| 5,201,692 A | | 4/1993 | Johnson et al. |
| 5,215,506 A | * | 6/1993 | Hara .......................... 475/86 |
| 5,284,065 A | | 2/1994 | Loeffler et al. ............... 74/477 |
| 5,314,387 A | | 5/1994 | Hauser et al. |
| 5,317,936 A | | 6/1994 | Shiba et al. |
| 5,323,890 A | | 6/1994 | Okada |
| 5,330,394 A | | 7/1994 | Hauser et al. |
| 5,339,708 A | | 8/1994 | Nakamura |
| 5,342,255 A | | 8/1994 | Slesinski et al. |
| 5,386,742 A | | 2/1995 | Irikura et al. |
| 5,404,772 A | | 4/1995 | Jester |
| 5,484,347 A | | 1/1996 | Holmquist |
| 5,528,958 A | | 6/1996 | Hauser |
| 5,549,523 A | * | 8/1996 | Doucet ....................... 475/298 |
| 5,558,592 A | * | 9/1996 | Honlinger et al. .......... 475/285 |
| 5,584,777 A | | 12/1996 | Sander et al. |
| 5,613,409 A | | 3/1997 | Hauser |
| 5,647,249 A | | 7/1997 | Okada et al. |
| 5,647,814 A | | 7/1997 | Krisher |
| 5,664,465 A | | 9/1997 | Okada et al. |
| 5,807,200 A | | 9/1998 | Hauser |
| 5,863,271 A | | 1/1999 | Schreier et al. |
| 5,897,452 A | | 4/1999 | Schreier et al. |
| 5,899,826 A | | 5/1999 | Schreier et al. |
| 5,911,296 A | * | 6/1999 | Cole et al. ............... 192/70.29 |
| 5,984,822 A | | 11/1999 | Schreier et al. |
| 6,007,449 A | | 12/1999 | Okada et al. |
| 6,015,362 A | | 1/2000 | Irikura et al. |
| 6,024,665 A | | 2/2000 | Hauser |
| 6,027,424 A | * | 2/2000 | Reynolds ..................... 475/316 |
| 6,056,663 A | | 5/2000 | Fett |

* cited by examiner

TRANSAXLE WITH DIFFERENTIAL LOCK MECHANISM

FIELD OF THE INVENTION

The present invention relates generally to driving apparatus comprising axles and, more particularly, relates to an integrated hydrostatic transaxle comprising a differential lock mechanism.

BACKGROUND OF THE INVENTION

As is known, the use of a standard differential assembly in the transmission system of a driving apparatus, such as a motor vehicle, allows the wheels to spin at different speeds. The differential assembly, or differential gear unit, differentially connects a pair of axle shafts. In the case of a vehicle traveling in a straight line, the axle shafts connected to the standard differential assembly will rotate at the same speed. When a turn or curve is encountered, the axle shaft nearest the inside of the turn will slow in rotational speed while the outer axle shaft will simultaneously increase in rotational speed. As such, the wheels, driven by the axle shafts, are prevented from scuffing the surface across which they travel.

While the standard differential assembly serves an important function in the operation of a transmission system, the standard differential of simple construction has difficulty operating under certain conditions. For example, when a first one of the drive tires is disposed in wet, muddy, or loose soil conditions, or when the first drive tire has been partially or completely removed from contact with the ground, the coefficient of friction under the first drive tire will be substantially lower than that associated with the second drive tire. This resulting frictional imbalance will tend to cause the second drive tire to remain stationary while the first drive tire will spin without moving the vehicle.

To solve the problem of loss of traction in transaxle systems, a variety of techniques have been developed to reduce the tendency of the transaxle to differential. For example, U.S. Pat. No. 5,897,452 to Schreier, et. al., issued Apr. 27, 1999, discloses a means for preventing free spinning of one of the driven shafts of a transaxle without interfering with the normal differential capability of the transaxle. In particular, the '452 patent discloses the use of spring washers to inwardly force the planet bevel gears of the differential into contact with frictional surfaces that reduce the tendency of the bevel gears to move and thus resists relative rotation of the axle shafts. In this manner, the frictional force limits the free spinning of one axle shaft relative to the other thereby improving traction.

While the friction inducing means disclosed in the '452 patent works for its intended purpose to provide transaxles with a controlled traction differential assembly, this assembly can still allow relative motion of one axle shaft with respect to the other under certain higher output torque operating conditions. For these conditions, a method of locking the two axle shafts together is required. Traditionally such locking methods have not generally been available to smaller transaxles due to space constraints. The present invention improves on the prior art.

SUMMARY OF INVENTION

An object of the present invention is to provide a differential system in an axle driving apparatus. In particular, it is an object of the present invention to provide an integrated hydrostatic transaxle having a differential locking mechanism assembly which will provide the hydrostatic transaxle with the benefits and advantages which have accrued to other types of transaxles that use differential locking mechanism assemblies.

Another object of the present invention is to provide a compact lockable differential mechanism supported by a drive gear rather than a separate housing. A further object of the present invention is to reduce part wear by reducing movable parts and integrating part of the locking system with the differential housing.

An object of the present invention is to provide a locking fork supported in a housing containing the differential assembly. A further object of the present invention is to provide this support by positioning the fork shaft at one end in one blind hole and at another end in one bushing.

Another object of the present invention is to simplify installation of a lock mechanism for a differential, whereby the transaxle may be retrofitted with the locking mechanism. A further object is to provide this simplified installation by providing sufficient clearance among components by positioning the shift mechanism and the lock mechanism away from the differential components. A further object is to reduce time and costs by reducing the number of installed parts and by simplifying the installation thereof. This object is particularly achieved by utilizing differential pins as part of the locking mechanism. A further object is to provide a more compact locking differential system through use of the differential pins.

A further object is to reduce wear and contact stresses on a sleeve of the locking mechanism. Another object is to reduce down-time and repair costs associated with fatigued parts by providing rotatable guides for connecting the sleeve with a fork; the fork being used to adjust the position of the sleeve.

Another object of the present invention is to provide a system less susceptible to inadvertent activation or damage to a control arm. A further object of the present invention is to reduce this susceptibility to damage by positioning the control mechanism in predetermined safe positions, preferably positions other than on the bottom side of a housing. Thus, even when good clearance is not obtainable, one avoids impacting curbs, debris, ground cover, etc. with the control arm when the arm is safely positioned in other locations.

In accordance with these and other objects, an integrated hydrostatic transaxle is provided. Generally, the transaxle comprises a hydrostatic transmission including a center section on which is supported a hydraulic pump unit and a hydraulic motor unit and a motor shaft drivingly connected to the hydraulic motor unit. A differential assembly is drivingly linked to the motor shaft for use in driving a pair of axle shafts. The differential assembly will be described in the context of spur gears.

The differential assembly comprises a pair of spur gears contained within a housing assembly formed by a bull gear and a separate plate. Drivingly associated with the spur gears of the differential are two gears matingly attached to two separate axle shafts, where one of these two gears has formed with it a spur gear (or sleeve gear) that extends beyond the housing formed by the bull gear. Matingly associated with this separate spur gear is a sleeve which is moveable to engage pins attached to the differential assembly. Such engagement thus prevents movement of the differential assembly with respect to the axle shaft, thereby locking to the two axle shafts together.

In a preferred embodiment of the invention, the differential housing is composed partially of the bull gear. Other embodiments may use separate housing parts affixed to the bull gear. In a preferred embodiment one of the spur gears is positioned in the differential assembly and an extension, e.g., a sleeve extending from the spur gear or from the axle, is positioned, at least partially, external to the differential assembly. Other embodiments may use two separate gears associated by splines, for example, on the shaft, or matingly associated with each other in some other fashion to accomplish the same purpose.

A better understanding of these and other objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the attached drawings which illustrate exemplary embodiments of the invention. For clarity, in some drawings, only enough of an exemplary embodiment is shown to aid the understanding of one of ordinary skill in the art.

DESCRIPTION OF EXEMPLARY EMBODIMENTS

Figure 1:
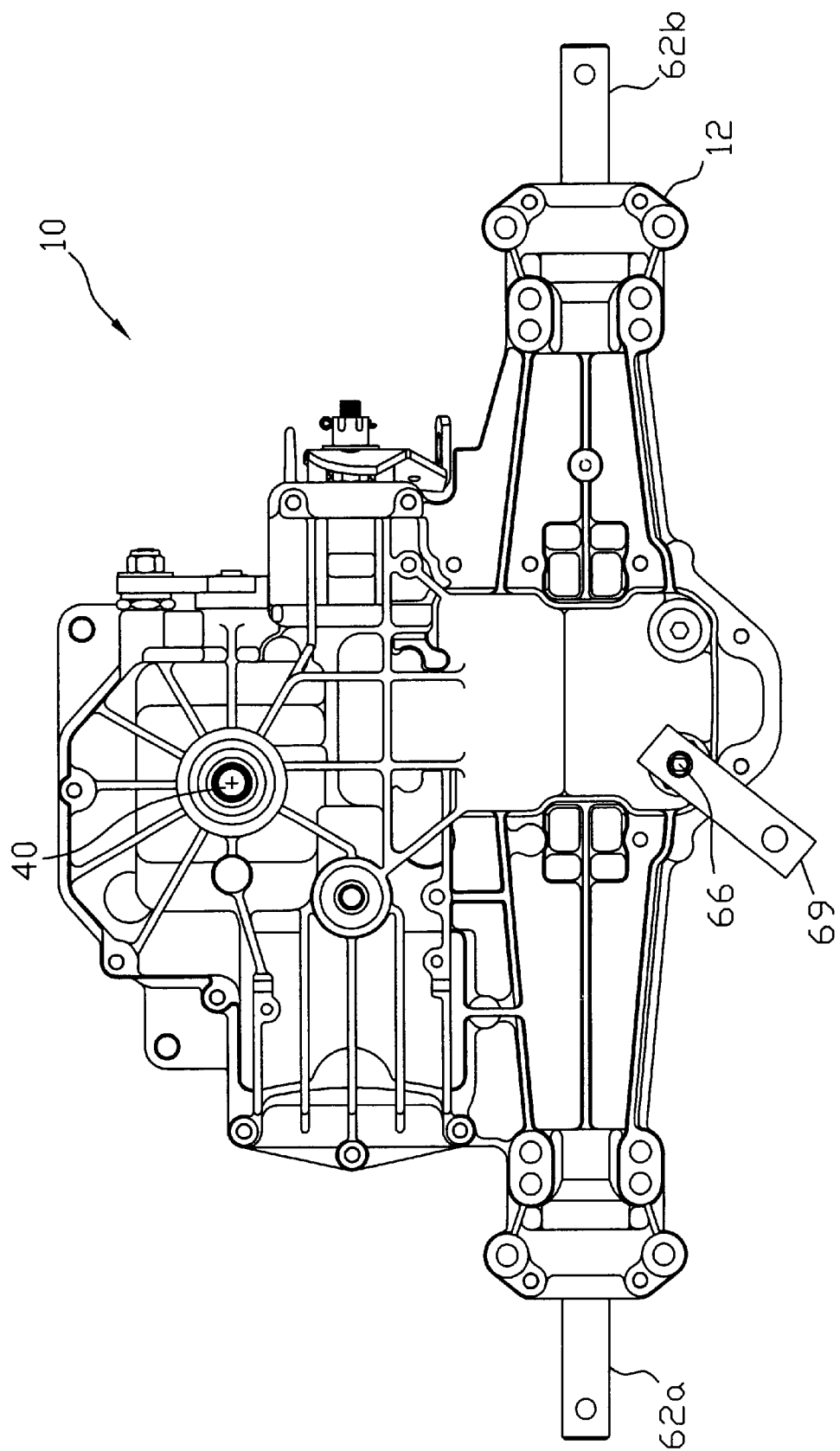
FIG. 1 illustrates a plan view of the top of an integrated hydrostatic transaxle having a differential lock mechanism in accordance with the present invention.
Figure 2:
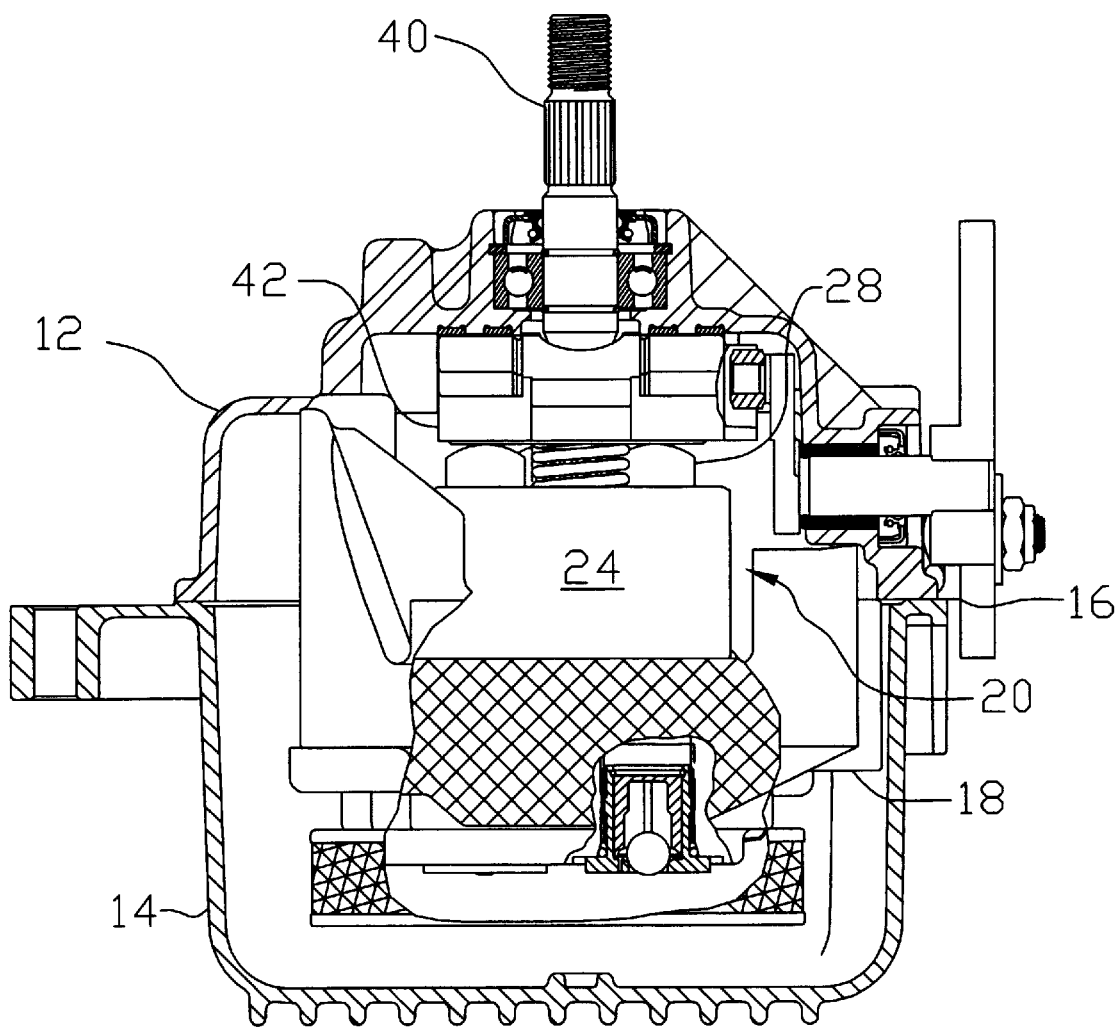
FIG. 2 illustrates a sectional view of the integrated hydrostatic transaxle showing details of the pump rotating group and related components.
Figure 3:
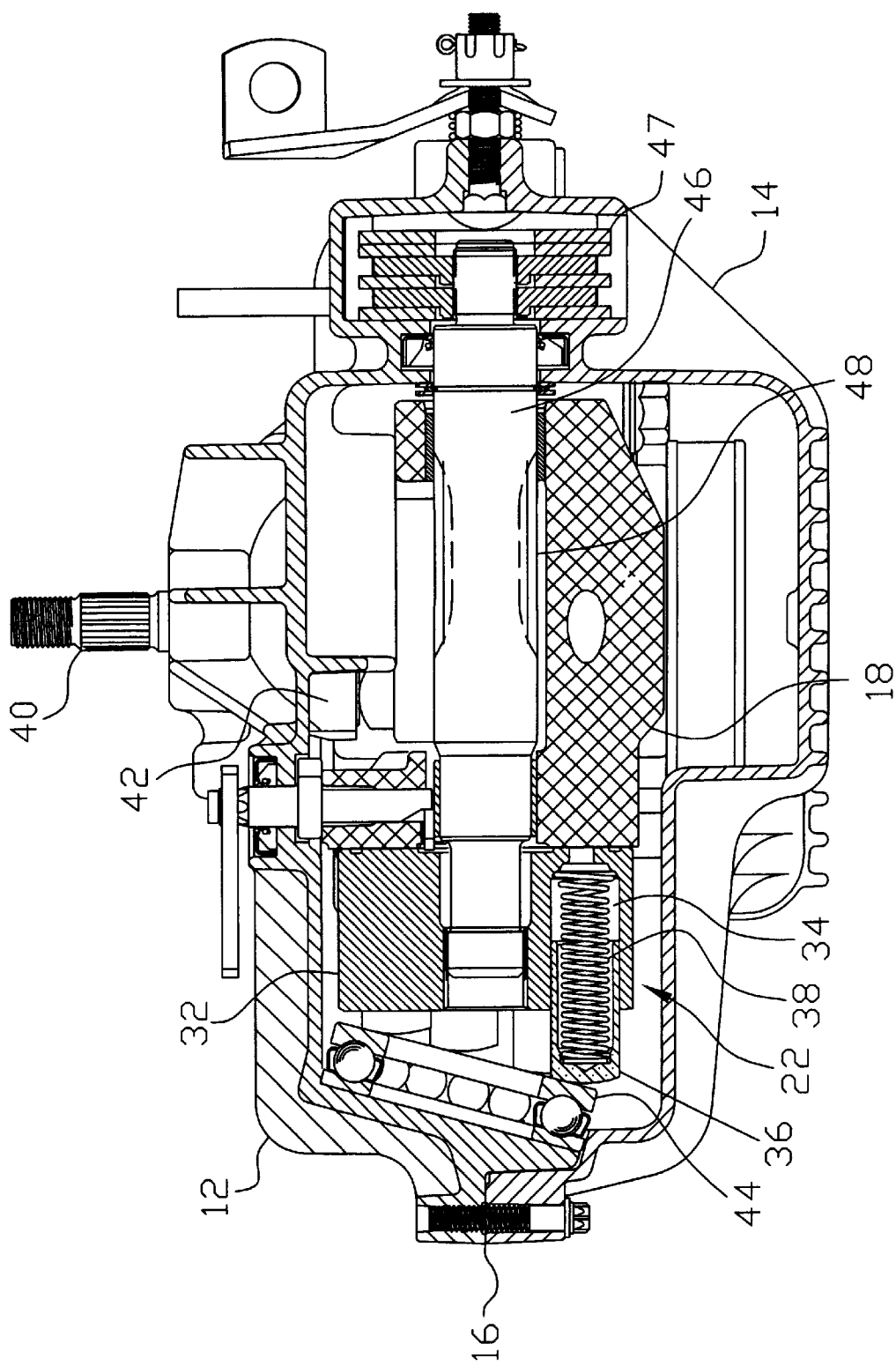
FIG. 3 illustrates a sectional view of the integrated hydrostatic transaxle showing details of the motor rotating group and related components.
Figure 4:
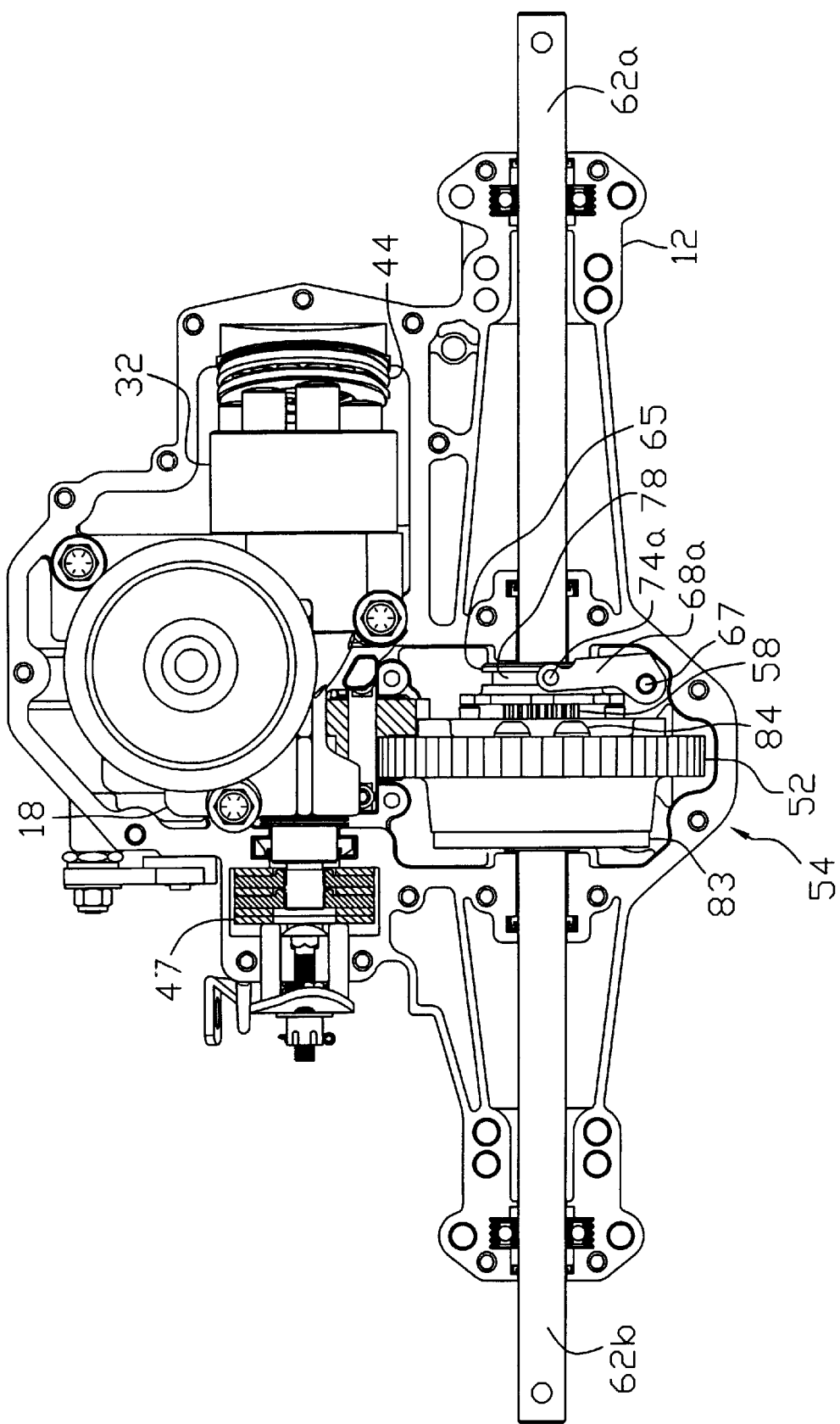
FIG. 4 illustrates a bottom view of the integrated hydrostatic transaxle with the bottom housing removed and having a differential lock mechanism in the inactivated position in accordance with the present invention.
Figure 5:
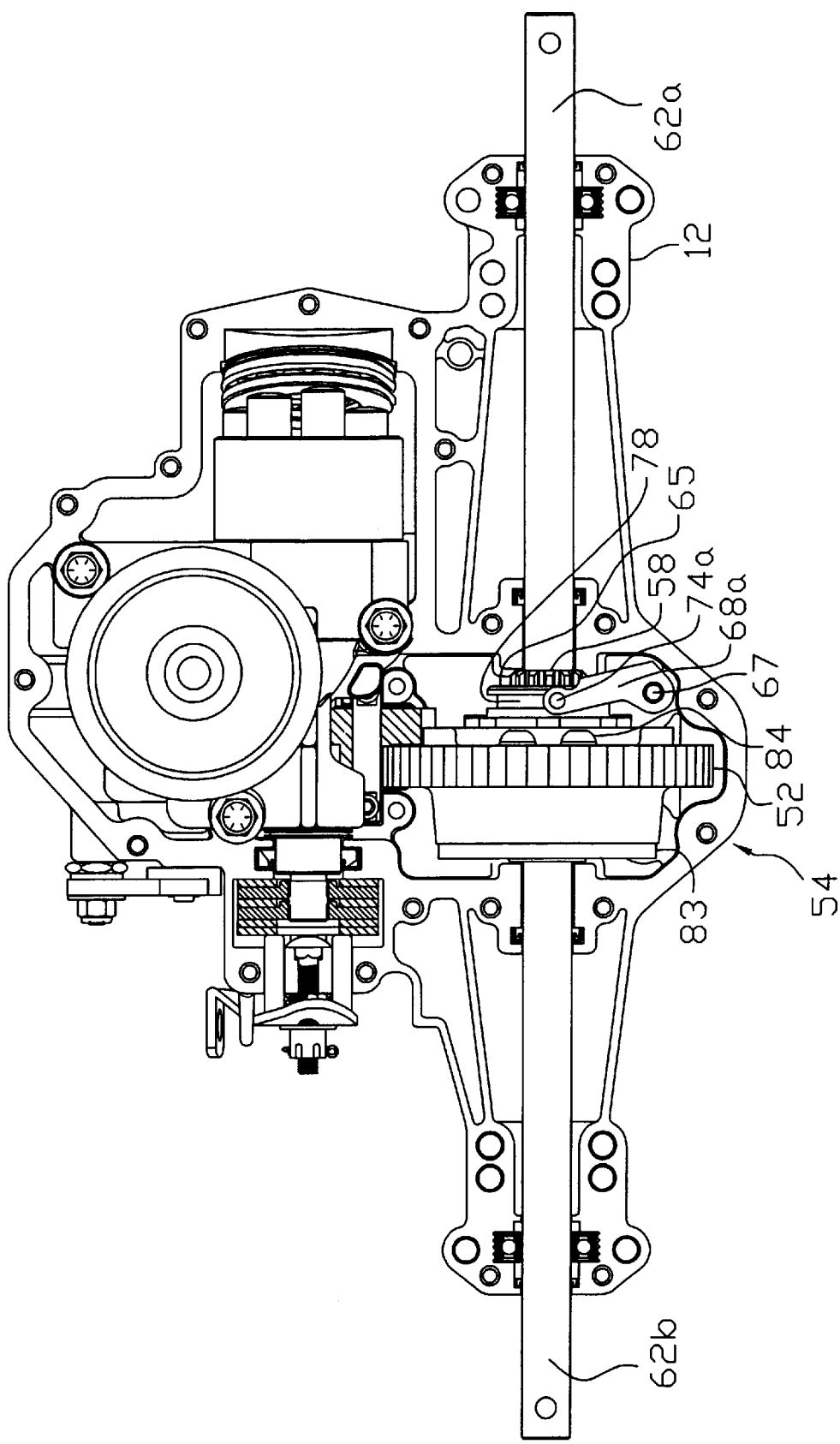
FIG. 5 illustrates a bottom view of the integrated hydrostatic transaxle with the bottom housing removed and having a differential lock mechanism in the activated position in accordance with the present invention.
Figure 6:
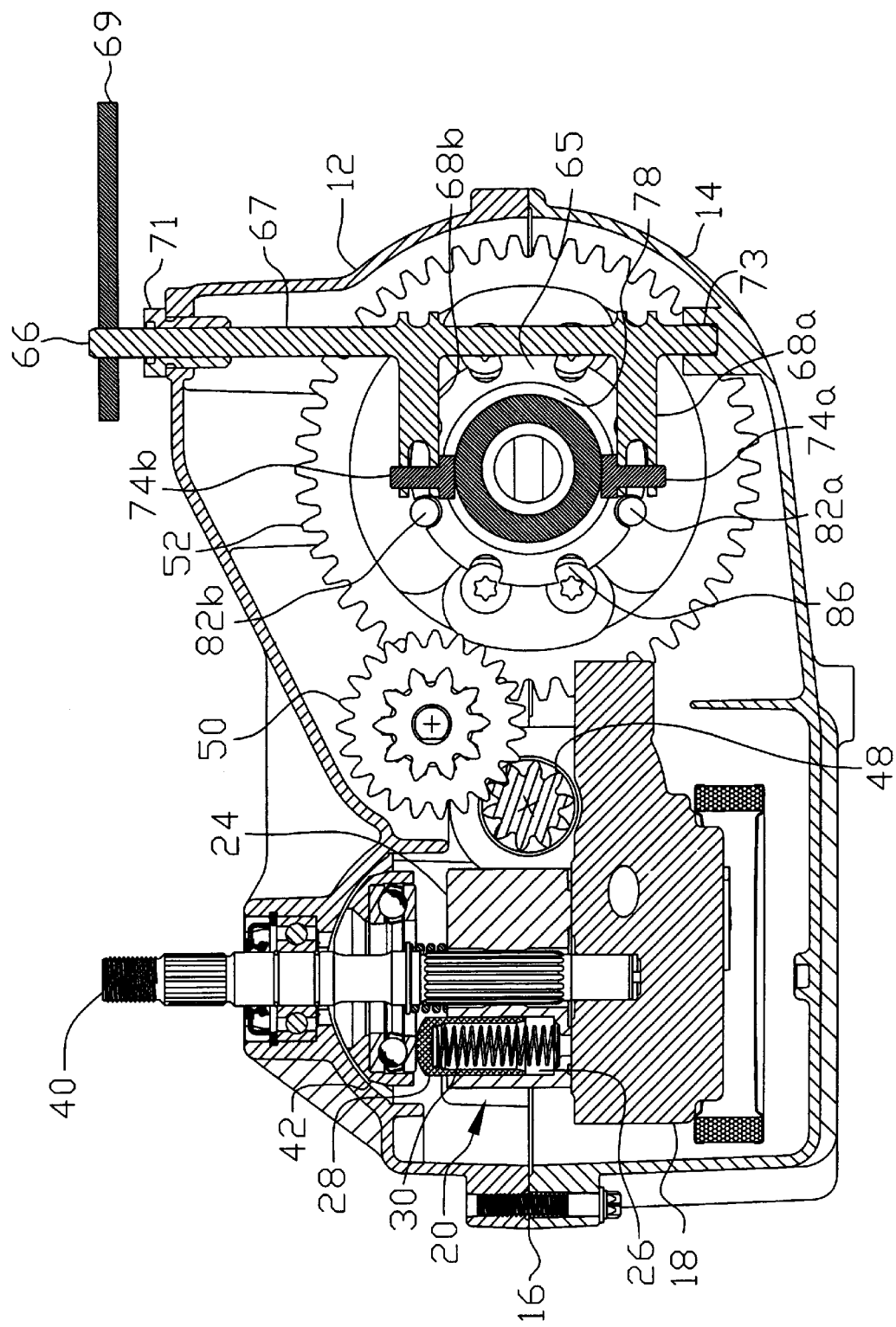
FIG. 6 illustrates a sectional view of the integrated hydrostatic transaxle showing details of the gearing.

While the invention can be used in connection with most types of axle driving apparatus, it will be described hereinafter in the context of an integrated hydrostatic transaxle ("IHT") as the preferred embodiment thereof.

Referring now to the figures, wherein like reference numerals refer to like elements, there is generally illustrated an IHT 10. While a brief description of the general construction and operation of the IHT will follow, the reader is referred to U.S. Pat. Nos. 5,201,692 and 5,314,387, which patents are hereby incorporated by reference in their entirety, for a more thorough discussion of this subject matter.

As illustrated, the IHT 10 is encased within a housing comprised of a first housing section 12 and a second housing section 14 joined along a substantially horizontal split line 16. It is to be understood, however, that the IHT described hereinafter may be disposed within a housing comprised of any number of housing sections having split lines in various orientations. Accordingly, the design of the housing illustrated is not meant to be limiting.

The IHT 10 includes a center section 18 having hydraulic porting formed therein on which are mounted a hydraulic pump unit 20 and a hydraulic motor unit 22. The particular arrangement of the center section 18, hydraulic pump unit 20, and hydraulic motor unit 22 may be varied according to space requirements dictated by the size and configuration of the vehicle with which said IHT is to be employed. Specifically, the hydraulic pump unit 20 generally comprises a pump cylinder block 24 having a plurality of piston receiving chambers 26 each of which movably contains a pump piston 28 and piston spring 30. Similarly, the hydraulic motor unit generally comprises a motor cylinder block 32 having a plurality of piston receiving chambers 34 each of which movably contains a motor piston 36 and piston spring 38. The hydraulic pump unit 20 is hydraulically connected to the hydraulic motor unit 22 through the hydraulic porting formed in the center section 18.

An input shaft 40, which is driven by the engine of the vehicle (not shown), is drivingly connected to the hydraulic pump unit 20 such that the rotation of the input shaft 40 rotates the pump cylinder block 24 therewith. The rotation of the pump cylinder 24 causes the pump pistons 28 to travel up and down as they travel against a swash plate 42. The swash plate 42 may be moved to a variety of positions to vary the stroke of pump pistons 28; this varies the volume of hydraulic fluid pumped into the hydraulic porting which, in turn, ultimately varies the speed of the hydraulic motor unit 22. Specifically, each motor piston 36 is driven by the pumped hydraulic fluid against a fixed, angularly orientated motor thrust bearing 44 such that the action of the motor pistons 36 against the thrust bearing 44 creates a rotational movement of the motor cylinder block 32. Drivingly connected to the motor cylinder block 32 is a motor shaft 46, which accordingly rotates therewith. A disc brake assembly 47 is also provided and connected to the motor shaft 46.

In the illustrated embodiment, the motor shaft 46 drives a first gear 48 that is drivingly connected to a reduction gear 50. The reduction gear 50 is drivingly connected to a third, bull, gear 52. The bull gear 52 imparts the rotational movement translated through the first and second gears from the motor shaft 46 to the differential assembly 54. It is to be understood, however, that the gear configurations described herein are meant to be illustrative only and that other variations may be employed without departing from the scope of the invention; e.g., the first gear 48 may be arranged to directly drive the bull gear 52 or may be adapted to drive additional gears for the purpose of providing further reduction.

FIGS. 4 through 10 illustrate various views of the differential lock mechanism. FIGS. 11–19 illustrate various embodiments of select features of the invention including means for connecting the first axle to the differential. The differential assembly 54 is a spur gear differential, comprising a pair of sun gears 56a and 56b and four planet spur gears 57a, 57b, 57c and 57d. The sun gears 56 rotate about an axis and the four planet gears, each rotatable about their own axes, rotate about the axis of the sun gears 56. While the invention is primarily described in the context of spur gears and a planet gear arrangements, other arrangements will be apparent to those of skill in the art.

Attached to one of the sun gears 56a is sleeve gear 58 which protrudes through opening 60 (more particularly, central opening 60) in bull gear 52. The sun gear 56a is matingly attached to axle shaft 62 by means of splines 64a and retained by means of nut 87a; likewise for sun gear 56b and axle shaft 62b. Preferably, the interior of the sleeve gear 58 is smooth and the interior of the sun gear 56a is splined to mate with the splines 64a of axle shaft 62a. Other connections to achieve attachment between the gears and the shafts will be apparent to those of skill in the art, for example, see FIGS. 13–18.

The planet spur gears 57a, 57b, 57c, and 57d are respectively rotatably mounted on pins 80a, 80b, 80c, and 80d. The pins 80 are mated to mating holes 81 in the bull gear 52 and a cover plate 83 thus being slidably fixed relative to the bull gear 52. The cover plate 83 is affixed to the bull gear 52 by means of screws 84 and forms a differential assembly housing 54h. Preferably, the pins 80 are positioned around the opening 60 in diametrically opposing pairs. Other configurations for assembling the gear differential components to accomplish the differentiating function are contemplated and will not affect the functioning of the differential lock mechanism described herein. Further, the bull gear 52 may be any suitable input gear, including a final drive gear that houses the differential assembly.

Sleeve 65, which may be referred to as a collar, is slidingly mounted by means of mating gears 72 on the sleeve gear 58. Though the invention is discussed in terms of a sleeve 65, it will be apparent from the foregoing that any slidable member slidably mounted on the axle shaft, and rotatably fixed relative thereto, that may be adapted to lockably interface with the bull gear 52 may be adapted to lock the differential assembly 54. More generally still, any releasably lockable member adapted to lock with, for example, the bull gear, may be used to prevent normal differentiating. The position of sleeve 65 is affected as the fork 66 is rotated by means of actuating arm 69. The fork 66 may also be referred to as a shift fork in some embodiments, particularly in those embodiments in which the sliding member is referred to as a shifter.

For some applications, the sleeve gear 58 in combination with the sun gear 56 may be replaced by a thrust collar which abuts the differential and receives thrust force generated from the differential gear. Further, the replacement part, e.g. the thrust collar may function as a stopper for preventing further sliding movement of the sleeve 65 along the axle and the replacement part in the direction of the other axle. Another object, of select embodiments, of the present invention is to reduce, relative to the prior art, the separating force along the axles. In angled gear arrangements, such as beveled gears, the force vector is resolved into two vector components. Specifically the force vector components run along a direction parallel to the axles and a direction perpendicular to the axles. By contrast, in a sun/planet spur gear arrangement the separation thrust is resolved (into vector components), substantially, perpendicular to axles, and thereby reducing the force along the axles. Generally, the remaining modest forces along the axles is the result of manufacturing and installation variations. Thus, by providing a gear arrangement that reduces, or redirects forces, the housing need not be as robust, reinforcing parts may be eliminated, and the housing may thus be of a lower relative weight.

Fork 66 is rotationally supported by a bushing 71 mounted in the housing 12 and by a mating hole 73 (a blind hole) in housing 14. Many other means for supporting the fork 66 in the housing 12 will be apparent; for example, eliminating the lower support, or eliminating the bushing. Also, the fork may be operably supported in a vertically split housing. Fork 66 has a fork shaft 67 and tines 68a and 68b. The tines 68a and 68b have holes 70a and 70b in which slot guides 74a and 74b are positioned. The slot guides 74a and 74b have a rectangular heads 76a and 76b matable with the sleeve 65 in a mating groove 78 of the sleeve 65. In this embodiment the head 76 is rectangular to decrease contact stresses where the slot guide 74 contacts the sleeve 65 inside groove 78. In other embodiments it may be possible for the head 76 to be round or rectangular.

As the fork 66 is rotated about an axis perpendicular to the axis of the axle, the fork tines 68 move in a plane generally perpendicular to the fork shaft 67, thus moving the slot guides 74. The movement of slot guides 74 along the axle shaft 62a, captured by mating groove 78 in sleeve 65, will correspondingly change the position of sleeve 65 along the length of sleeve gear 58 (and the axle shaft 62a). Thus, the sleeve 65 may be moved between locked and unlocked positions. In the embodiment shown in FIG. 19 the slot guides 74 are allowed to move rotationally about an axis parallel to the fork shaft 67 by means of the mating holes 70. This movement is desired as the orientation of the rectangular head 76 will change with respect to the fork 66 as the fork is rotated. To reduce wear on and fatigue to the sleeve 65, the guides 74 should be allowed to rotate in the tines 68. The mating groove 78 also allows the slot guides 74 to affect the position of the sleeve 65 while allowing the sleeve 65 to rotate with the axle shaft. Thus, the sliding member and the fork may operate together to form a differential locking system.

Figure 7:
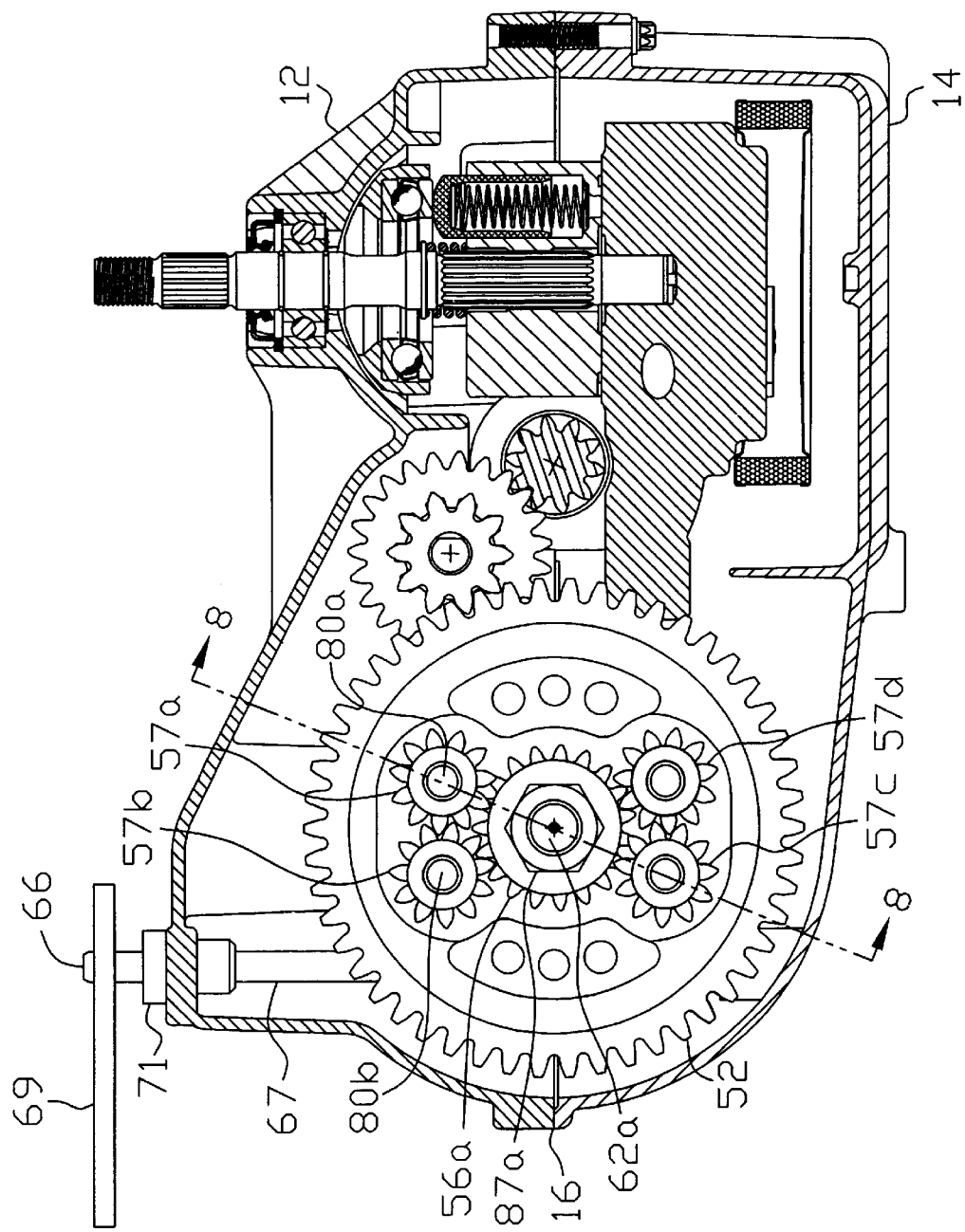
FIG. 7 illustrates a sectional view of the integrated hydrostatic transaxle similar to FIG. 6, viewing the differential assembly from the opposite side as FIG. 6. The second axle and associated sun gear have been removed for clarity.
Figure 8:
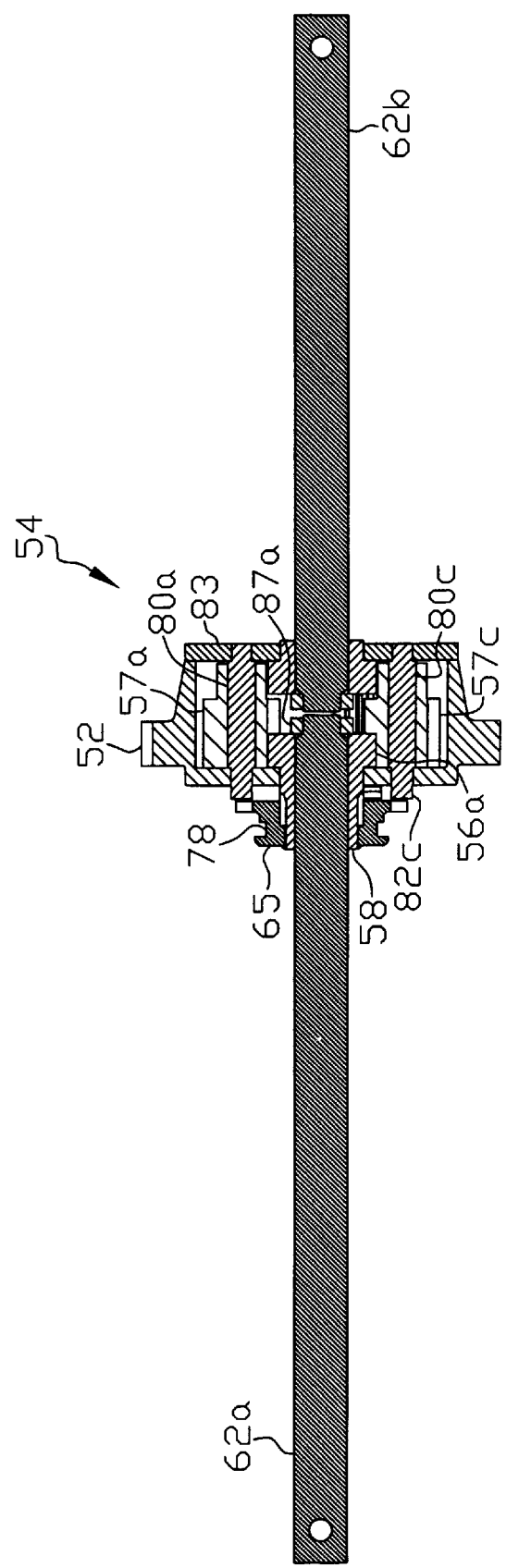
FIG. 8 illustrates a sectional view of the axles and differential assembly incorporating a differential lock mechanism in accordance with the present invention.

Normal differentiating action will now be described with reference to FIGS. 7 and 10. Each axle shaft 62a and 62b rotates with its respective sun gear 56a and 56b. Referring to FIG. 7, planet gears 57b and 57d are mated with sun gear 56a, whereas planet gears 57a and 57c are not. Thus, when sun gear 56a rotates counterclockwise, planet gears 57b and 57d rotate clockwise. Planet gear 57b is matingly connected with planet gear 57a, so rotation of planet gear 57b clockwise causes planet gear 57a to rotate counterclockwise. Planet gear 57a is similarly mated with sun gear 56b. Thus, counterclockwise rotation of planet gear 57a causes clockwise rotation of sun gear 56b. Through this connectivity, it is apparent that once one axle is locked with respect to bull gear 52 for example, both axles will be locked relative to one another, i.e., normal differentiating action will be suspended.

Figure 10:
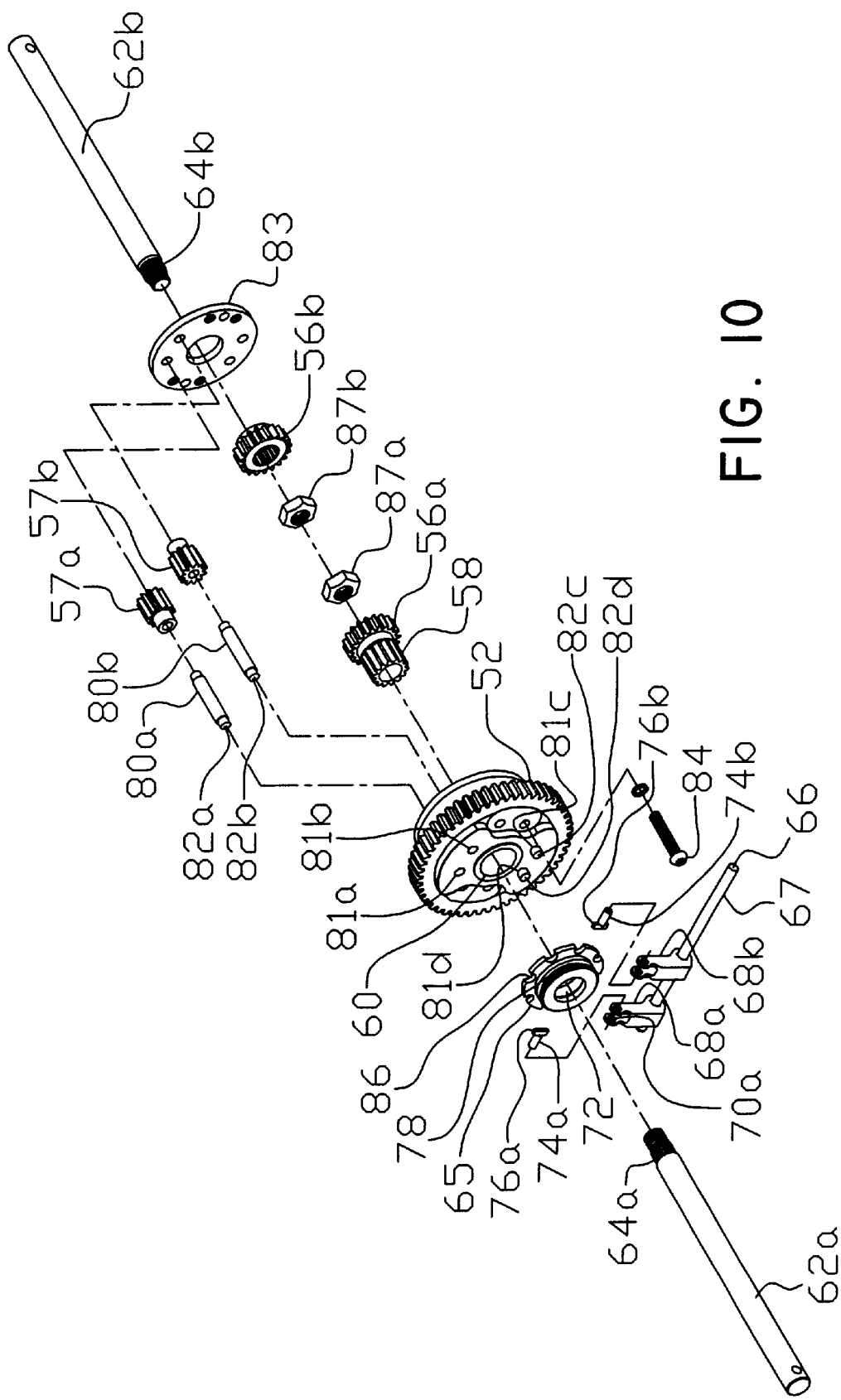
FIG. 10 illustrates a perspective view of the axles and differential lock mechanism in accordance with the present invention.

The sleeve 65 in FIG. 10 is positioned to move generally perpendicular to the bull gear 52. When sleeve 65 is positioned by fork 66 away from the bull gear 52, it will allow normal differentiating action by means of sun gears 56 and planet spur gears 57. For compactness, the sun and planet gears are preferably contained within differential assembly housing 54h formed by the cover plate 83 and the bull gear 52 thereby eliminating an additional housing. This saves space, weight and costs as well as improving reliability due to a decreased number of parts. As sleeve 65 is positioned by fork 66 toward differential assembly 54, slots 86 formed in the sleeve will engage the heads 82 of pins 80, and thus prevent rotation of the axle shaft 62a with respect to bull gear 52. Since one axle shaft (axle shaft 62a) is now locked to the bull gear 52, differential action is prevented and the differential is locked. By associating the pins 80 with the bull gear 52 and using a sleeve 65 having pin accepting slots 86, the locking assembly has the advantages of: reducing the total number of installed parts; reducing the number of wearable parts; simplifying the installation process; improving reliability by, among other means, reducing the number of movable parts; providing a compact integrated differential housing, and thus reducing weight, while further improving installation and repair processes as installed parts are more easily accessible; and eliminating the need for an input gear central reinforcing member to withstand shear stresses as the pins are supported, preferably, in both the bull gear and the cover plate which are connected to form the compact differential housing assembly. These are just a few of the advantages the present invention has over the prior art. Other advantages and features will be readily apparent to those of skill in the art from the teachings herein.

Figure 9:
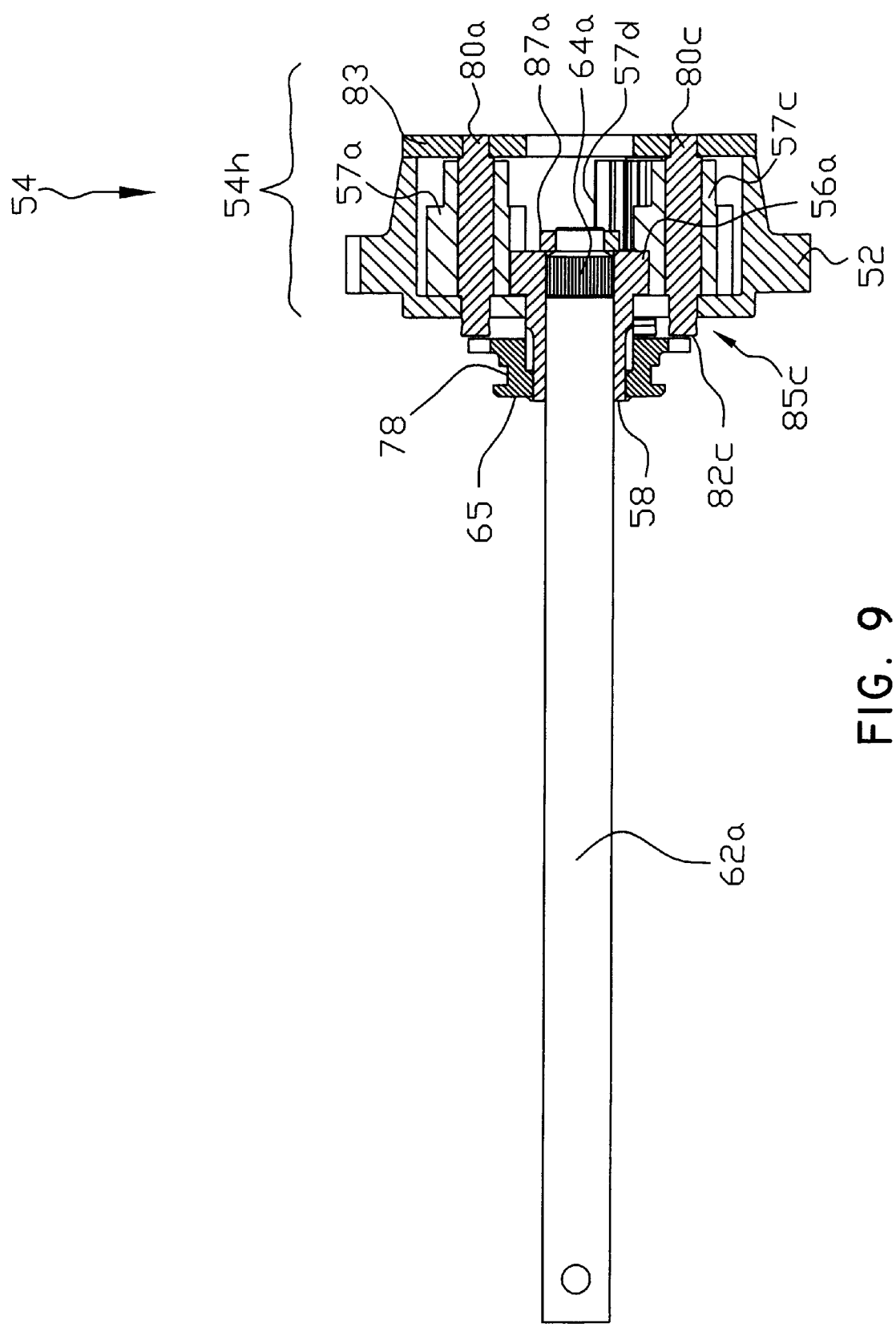
FIG. 9 illustrates a modified view of the section view shown in FIG. 8. The first axle shaft is shown whole to illustrate the splines, and the second axle shaft and the second sun gear are removed for clarity.

Note that in the embodiment shown in FIG. 9 heads 82 of pins 80 are angled such that an undercut 85a, b, c, and d is respectively formed on heads 82a, b, c, and d. This undercut 85 aids in keeping the sleeve 65 in position once the differential is locked. Rotating the fork 66 in the opposite direction to disengage the sleeve 65 from the pin heads 82 will again allow relative motion of axle shafts 62 by means of the differential assembly 54, i.e., normal differentiating action.

Figure 11:
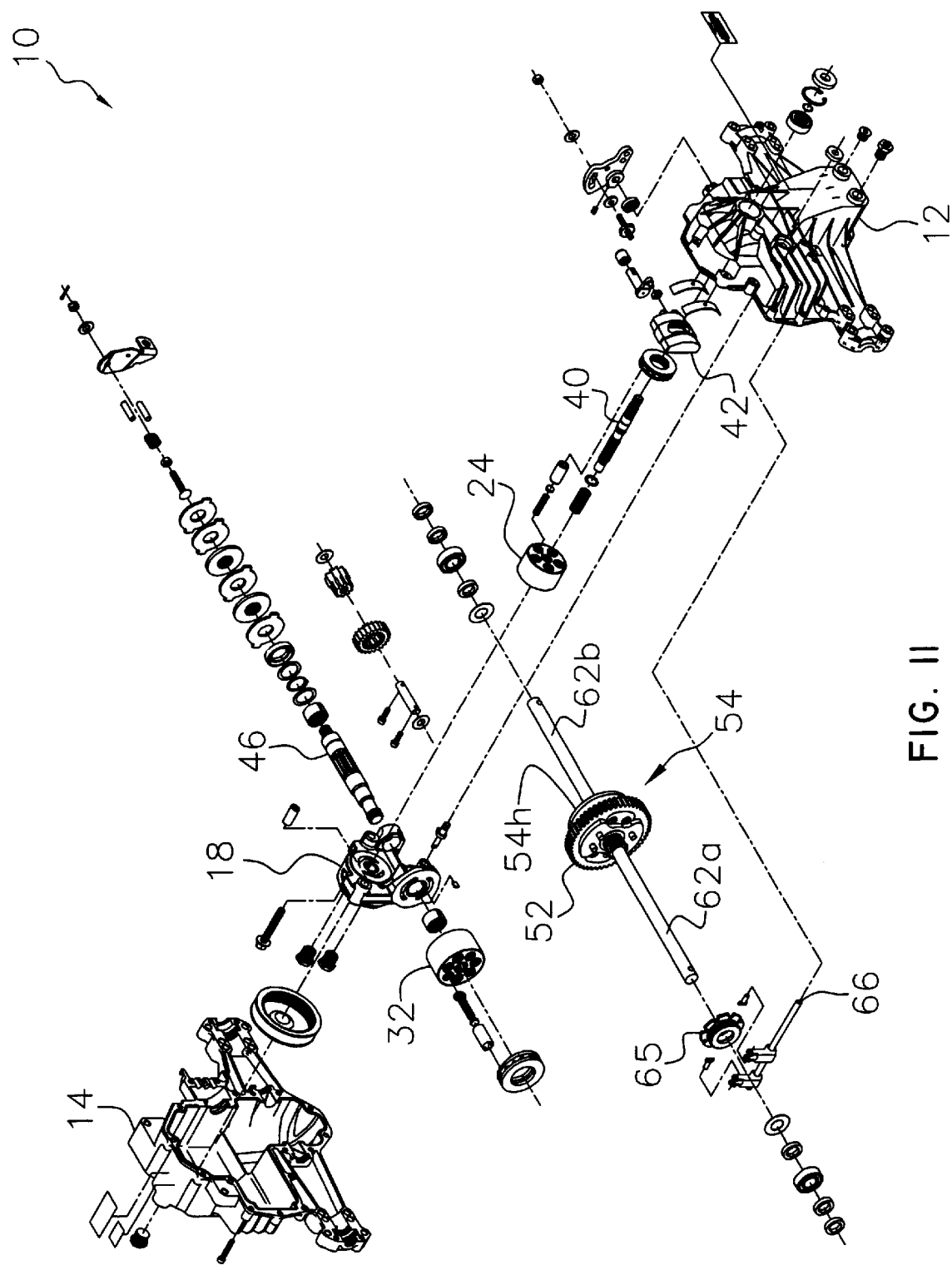
FIG. 11 is an exploded perspective view of the horizontally split IHT. The IHT is rotated about an axis parallel to the axles.
Figure 19:
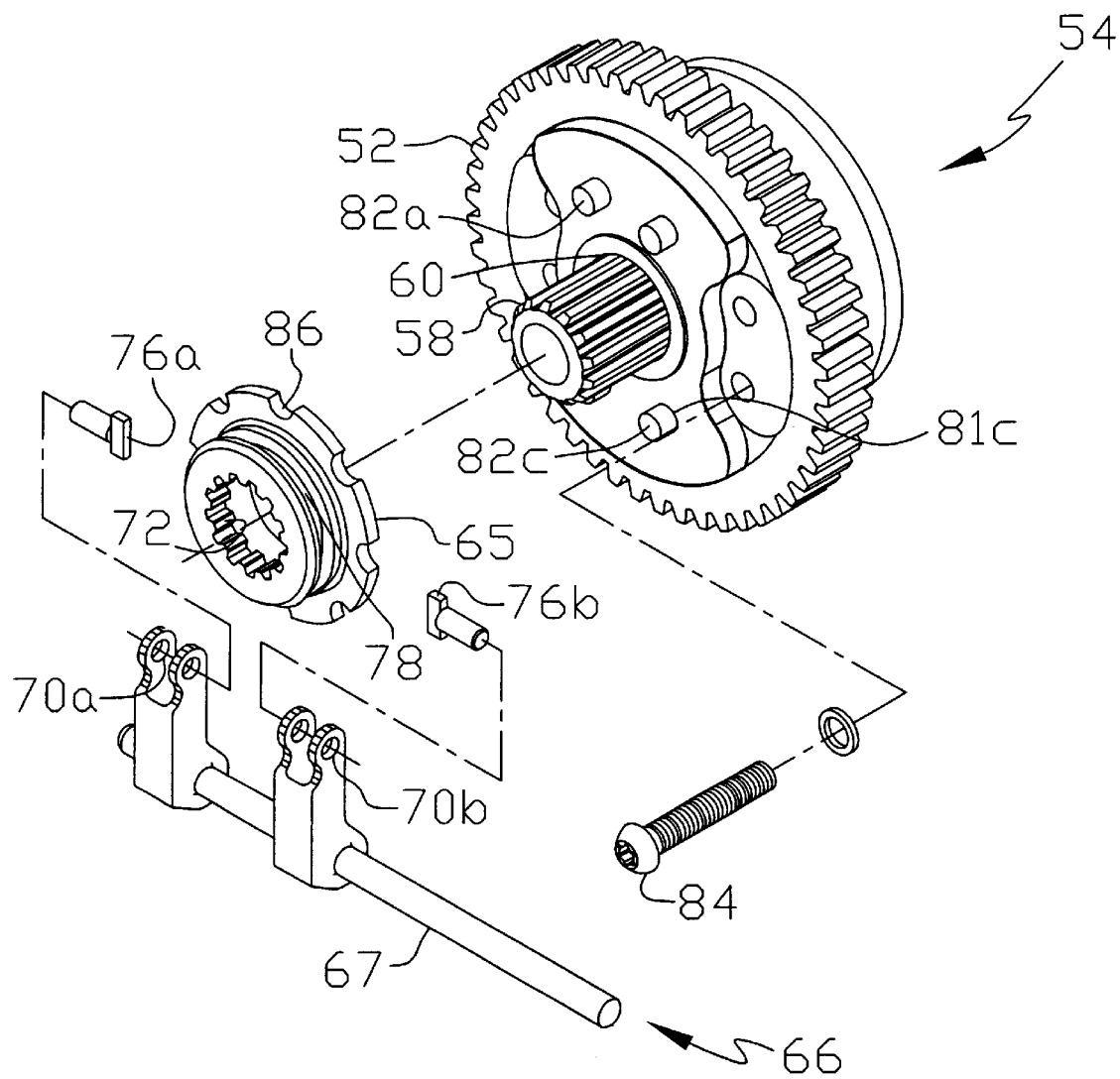
FIG. 19 illustrates an enlarged view of the differential assembly and locking system shown in FIG. 10. The sleeve gear is, however, shown inserted in and extending through the bull gear.

FIG. 11 shows an exploded view of the horizontally split IHT 10 rotated about an axis parallel to the axles 62. FIG. 10 shows an exploded view of the differential assembly 54 shown in FIG. 11. FIG. 19 shows an enlarged, assembled, view of the differential assembly 54 shown in FIG. 10. The sleeve gear 58 is shown inserted in and extending through the bull gear 52. The mating gears 72 of the sleeve 65 are shown more clearly in FIG. 19.

Figure 12:
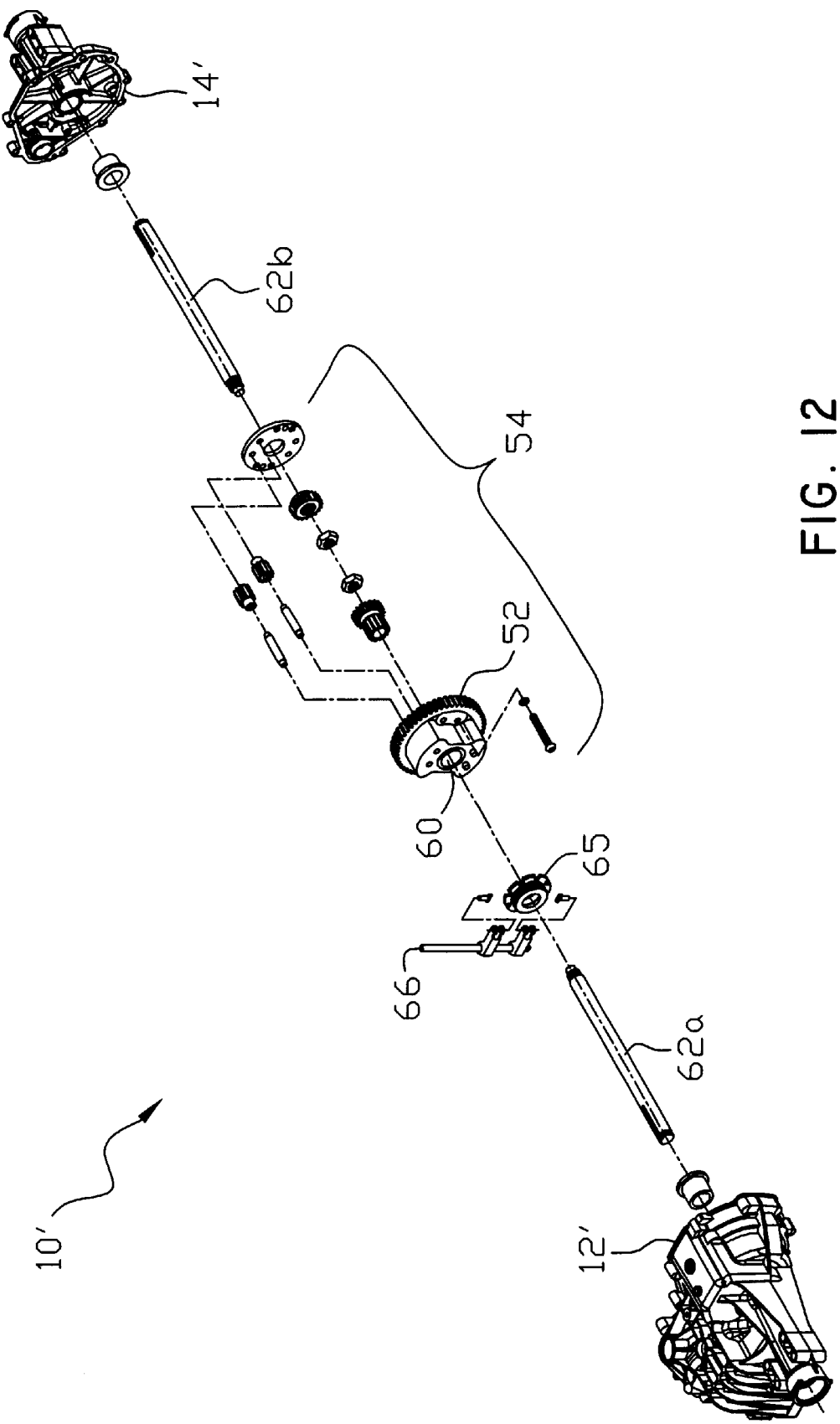
FIG. 12 depicts a vertically split IHT, wherein the split is parallel to the differential assembly.

In contrast to FIG. 11, FIG. 12 shows a vertically split IHT 10' having a vertical split parallel with the bull gear 52. The vertically split IHT 10' includes first and second housings 12' and 14'.

Figure 13:
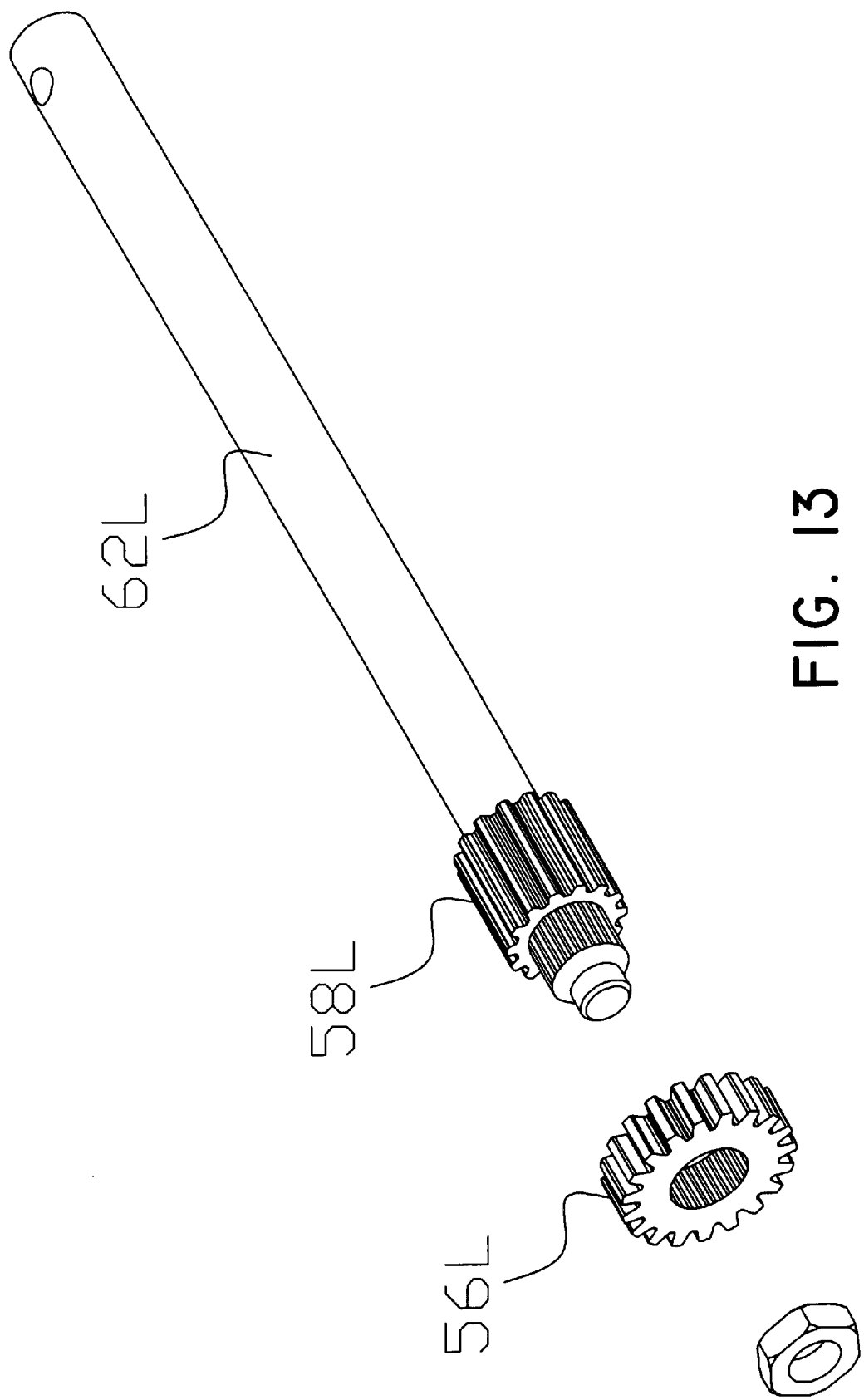
FIG. 13 illustrates a first axle shaft embodiment wherein the sleeve gear is integral therewith. The spur gear is shown separated from the sleeve gear.
Figure 14:
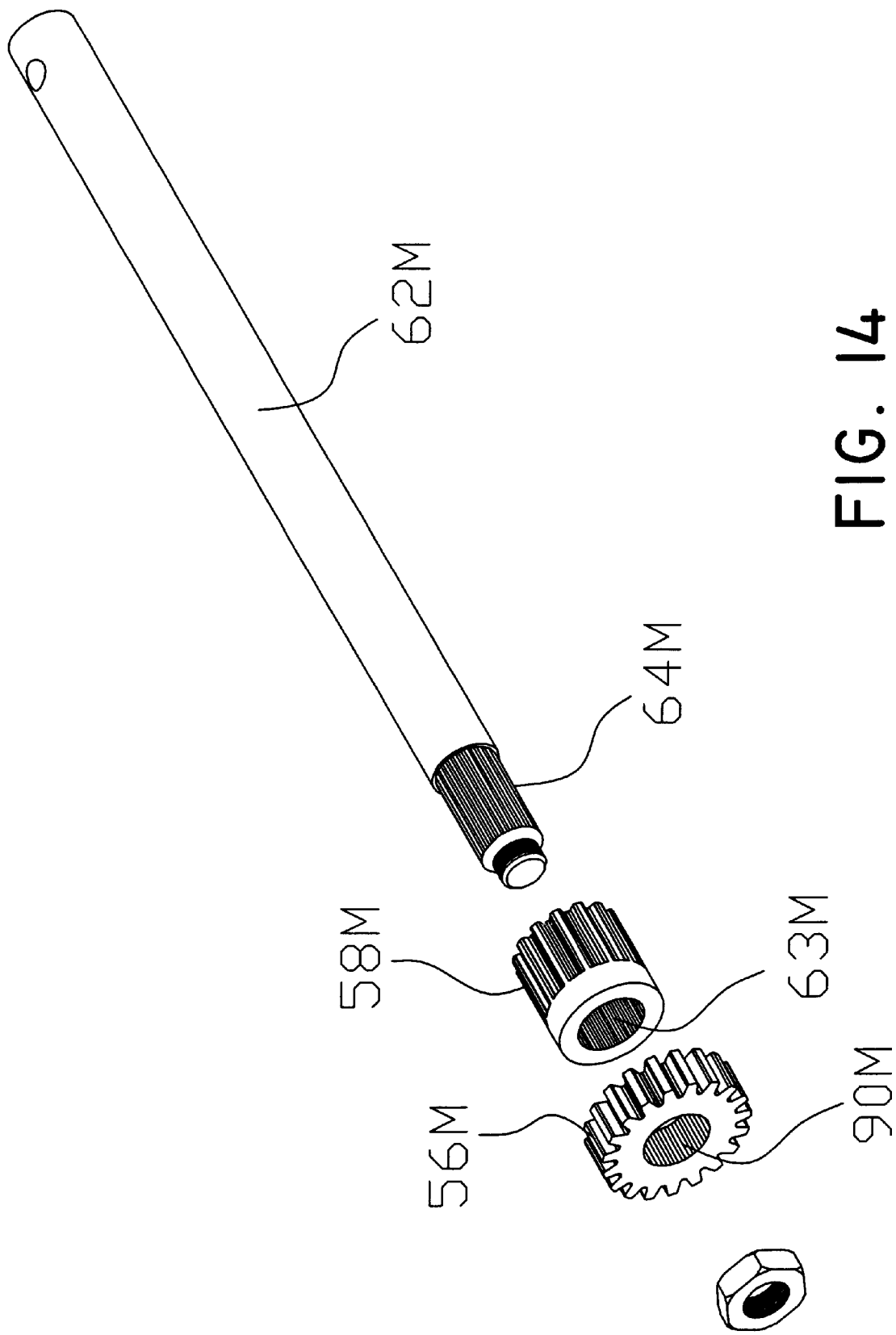
FIG. 14 depicts the first axle shaft having splines for mating with the sleeve gear which has conforming splines. The spur gear likewise has internal splines for mating with the axle shaft.
Figure 15:
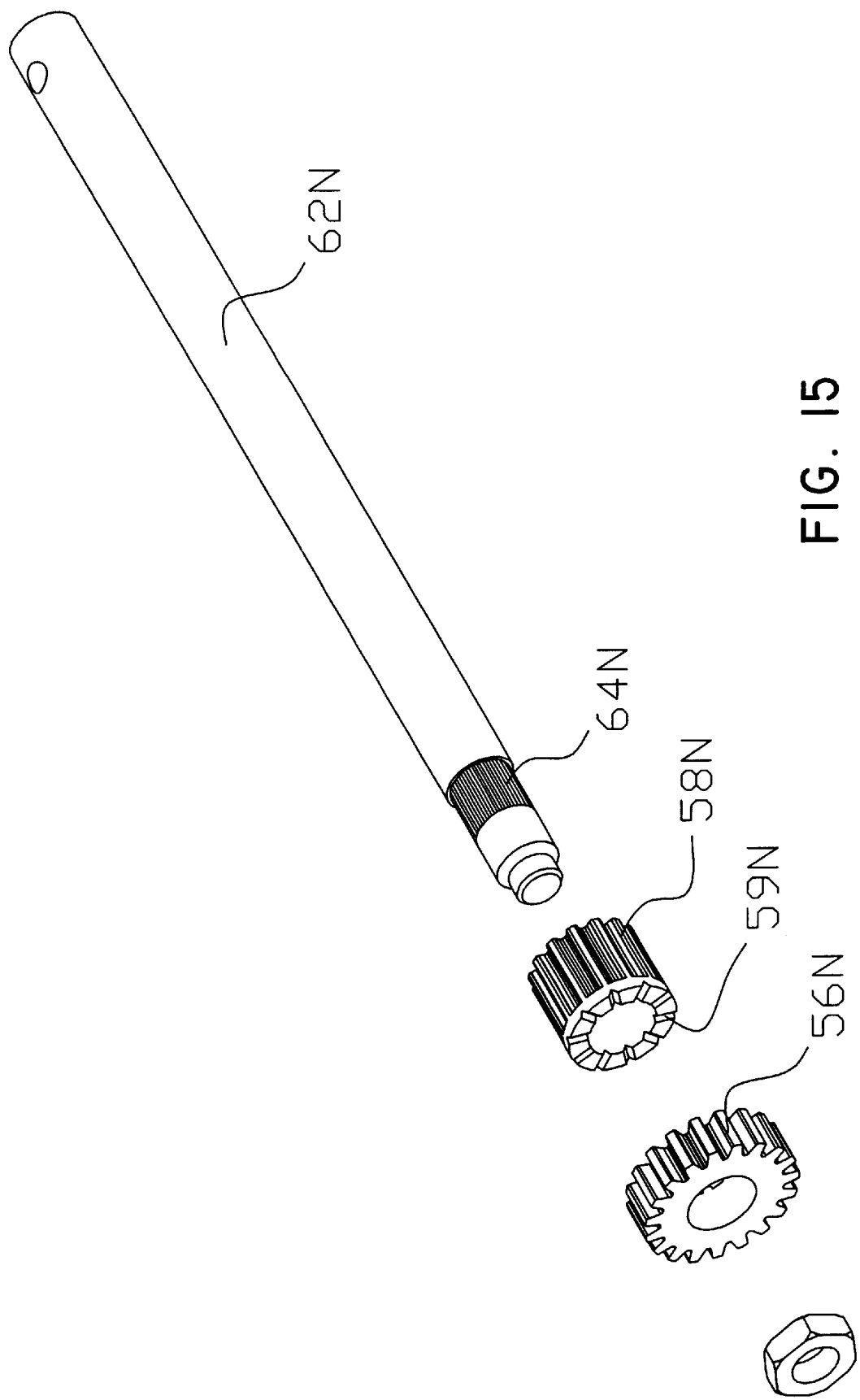
FIG. 15 shows the first axle shaft having splines for mating with the separable sleeve gear. The sleeve gear comprises friction elements for frictionally engaging the spur gear.
Figure 16:
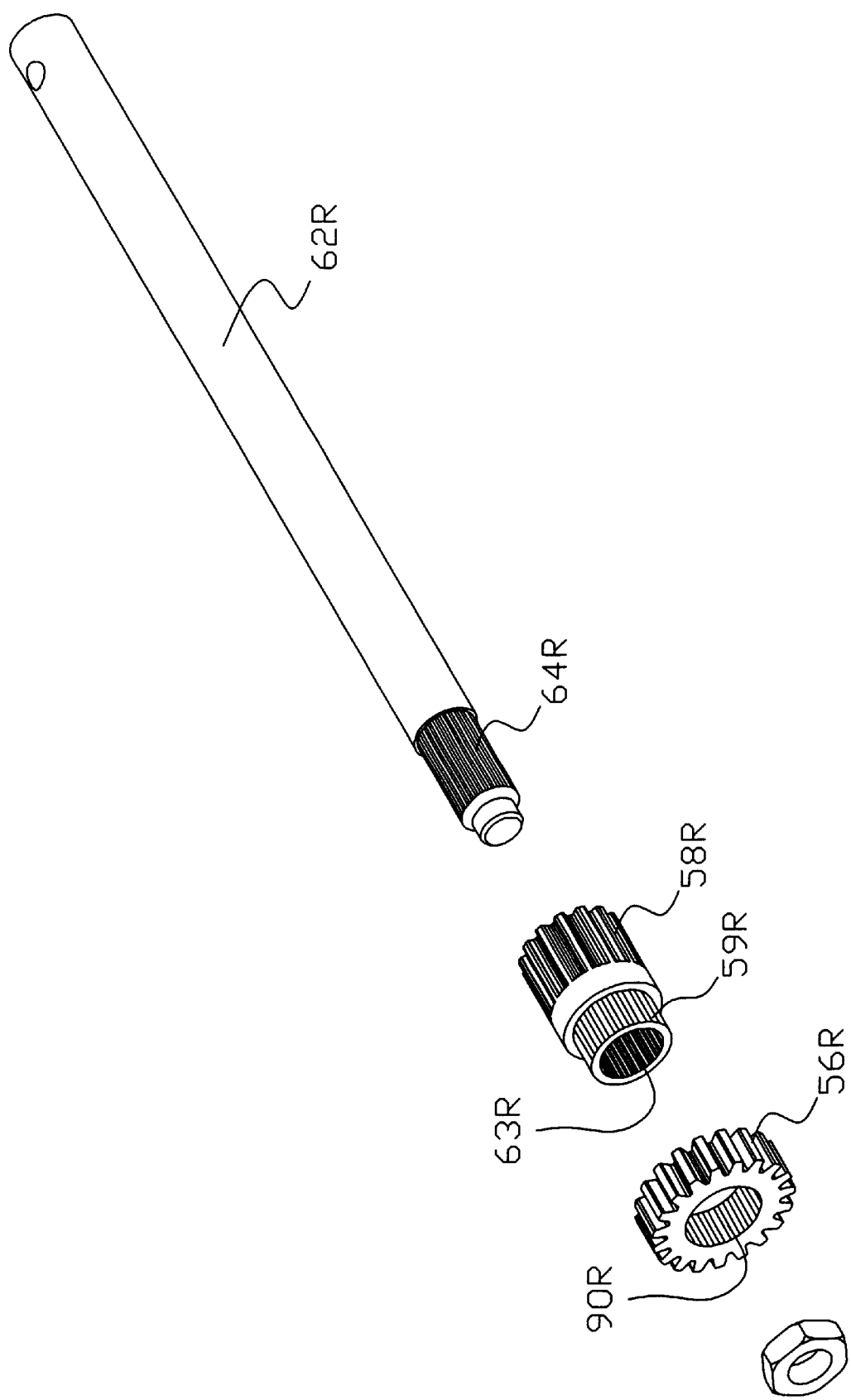
FIG. 16 shows the first axle shaft having splines sufficiently long to mate with the sleeve gear. The sleeve gear includes internal and external splines, wherein the external splines of the sleeve gear mate with internal splines of the spur gear.
Figure 17:
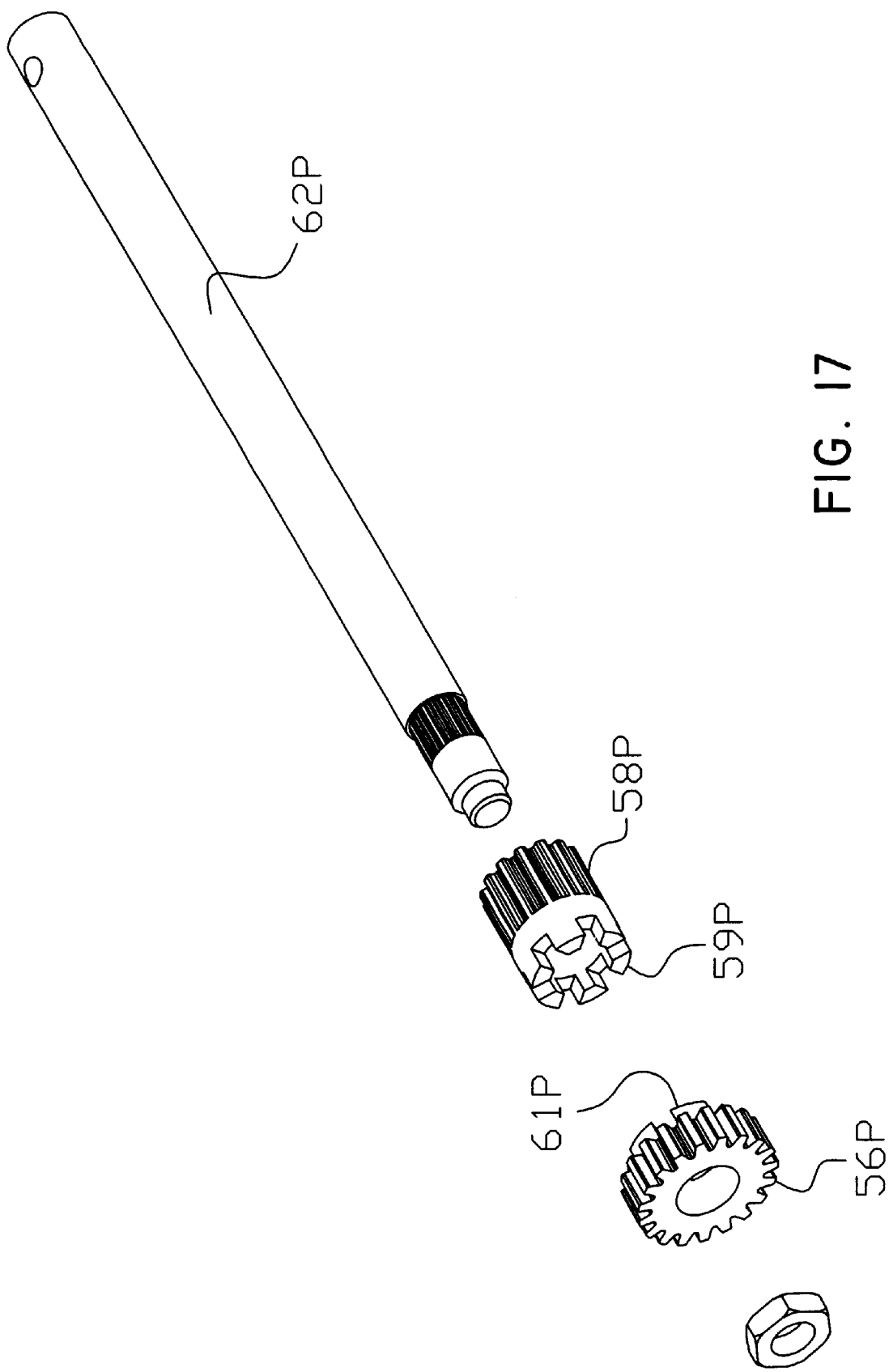
FIG. 17 shows axle mating means similar to those shown in FIG. 15. The frictional elements of FIG. 15 are, however, replaced with crenelations disposed on both the sleeve gear and the spur gear which matingly conform to one another.
Figure 18:
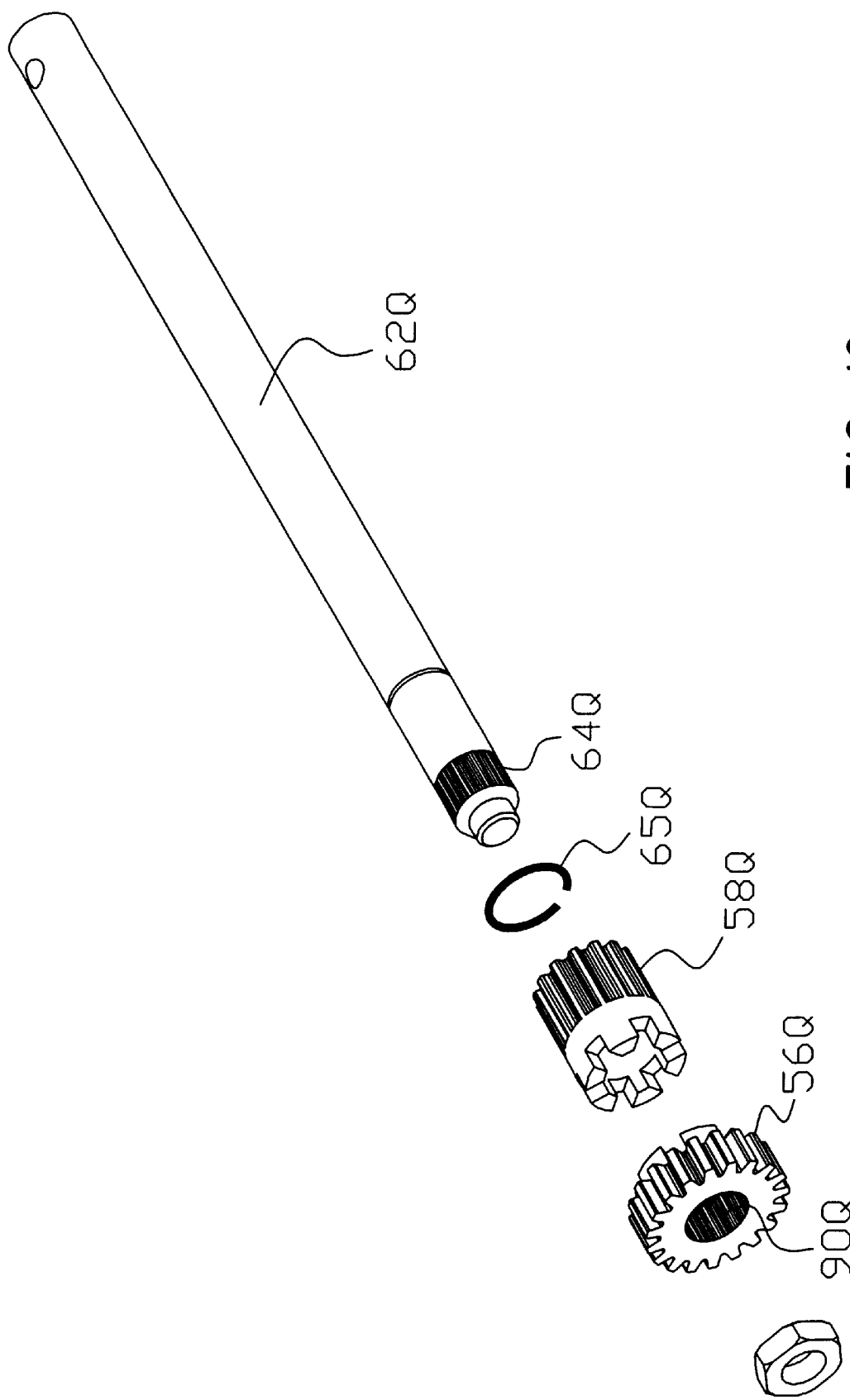
FIG. 18 is substantially similar to FIG. 17, however, the sleeve gear is supported on the end of the axle shaft by a retaining ring rather than a large diameter of the axle shaft. The axle shaft may therefore be made of a substantially uniform diameter over its substantial length at reduced cost. Splines are disposed on the end of the axle shaft to mate with splines on the interior of the spur gear.

Other means and methods for securing the axle shaft with the differential exist. FIGS. 13–18 disclose exemplary embodiments for interfacing the axle shaft with the sleeve gear and a sun gear and, more generally, with the differential assembly. FIG. 13 illustrates the axle shaft 62L having the sleeve gear 58L integral therewith. The sun gear 56L (e.g., a spur gear) is shown separated from the sleeve gear 58L. FIG. 14 depicts the first axle shaft 62M having splines 64M for mating with the sleeve gear 58M which has conforming splines 63M. The spur gear 56M likewise has internal splines 90M for mating with the axle shaft 62M. FIG. 15 shows the first axle shaft 62N having splines 64N for mating with the separable sleeve gear 58N. The sleeve gear 58N comprises friction elements 59N (or conforming elements) for frictionally engaging the spur gear 56N. The friction elements 59N include a plurality of detents around the perimeter of the sleeve gear 58N. Once the nut clamps the spur gear to the sleeve gear, the torsional contact will prevent the spur gear from rotating relative to the sleeve gear. FIG. 16 shows the first axle shaft 62R having splines 64R sufficiently to mate with the sleeve gear 58R. The sleeve gear 58R includes external splines 59R, and internal splines 63R. The internal splines 63R mate with the axle shaft 62R. The external splines 59R are of a different dimension than the internal splines 63R and the external splines 59R of the sleeve gear 58R mate with internal splines 90R of the spur gear 56R. The internal/external spline embodiment of the sleeve gear 58R is particularly useful for heavy duty transmissions where one wants to vary the spline dimensions. FIG. 17 shows axle shaft 62P with mating means similar to those shown in FIG. 15. The frictional means of the sleeve gear 58N shown FIG. 15 is, however, replaced with crenelations 59P and 61P disposed on the sleeve gear 58P and the spur gear 56P, respectively, such that the sleeve gear 58P will mate with the spur gear 56P. FIG. 18 is substantially similar to FIG. 17, however, the sleeve gear 58Q is prevented from sliding along the shaft 62Q by a retaining ring 65Q. The axle shaft 62Q may then be made of a substantially uniform diameter over its substantial length. Splines 64Q are disposed on the end of the axle shaft 62Q to mate with splines 90Q on the interior of the spur gear 56Q.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A transaxle comprising:
   a first axle and a second axle;
   a differential operably connected to the first and second axles, the differential including a bull gear having a pin extending therefrom;
   a sleeve slidably mounted along and rotatably fixed relative to the first axle, the sleeve being slidable between a locked position wherein the sleeve engages the pin and an unlocked position wherein the sleeve is free of the pin; and
   an actuator arm connected to the sleeve, wherein actuation of the actuator arm affects the position of the sleeve.

2. The transaxle of claim 1, comprising a first gear rotatably fixed relative to the first axle, a sleeve gear connected to the first gear and extending along the first axle, wherein the sleeve is slidably mounted on and rotatably fixed relative to the sleeve gear.

3. The transaxle of claim 2, wherein the sleeve gear extends into the bull gear.

4. The transaxle of claim 3, wherein the sleeve gear extends through the bull gear.

5. The transaxle of claim 1, comprising a fork connecting the actuator arm and the sleeve.

6. The transaxle of claim 5, wherein the fork comprises a fork shaft generally perpendicular to the first axle and a tine extending from the fork shaft and connected to the sleeve.

7. The transaxle of claim 6, wherein the sleeve comprises a mating groove connecting the sleeve to the tine.

8. The transaxle of claim 7, wherein the fork comprises a guide positioned in the tine and matingly engaged with the mating groove.

9. The transaxle of claim 6, wherein the fork comprises another tine extending from the fork shaft and a pair of guides rotatably positioned in the tines, wherein the guides engage the sleeve therebetween.

10. The transaxle of claim 6, wherein the fork comprises a guide rotatably positioned in the tine and matingly engaging the sleeve.

11. The transaxle of claim 1, where in the pin in undercut, and wherein the sleeve comprises a slot lockable with the pin.

12. A differential kit for a pair of axles, the kit comprising:
a differential input gear mounted to rotate about a longitudinal axis of and relative to the pair of axles, the input gear including a generally cylindrical pin extending therefrom, said pin having a longitudinal axis parallel to the longitudinal axis of said pair of axles; and
a locking member slidably mounted on one of the pair of axles, wherein the locking member is adapted to releasably engage the pin.

13. The kit of claim 12, wherein the locking member comprises a plurality of slots adapted to lock to engage the pin.

14. The kit of claim 12, wherein the pin is undercut.

15. The kit of claim 12, comprising a fork having a pair of tines, the tines being adapted to rotatably engage the locking member.

16. The kit of claim 15, wherein the fork comprises a pair of guides rotatably positioned in the tines and adapted to mate the pair of tines with the locking member.

17. The kit of claim 15, wherein the locking member is a sleeve having a mating groove adapted to mate with the pair of tines.

18. A driving apparatus comprising:
a pair of axles having a longitudinal axis;
a differential assembly differentially connecting the pair of axles, the differential assembly comprising:
a first gear rotatable with a first of the pair of axles,
a second gear rotatable with a second of the pair of axles,
a plurality of planet gears matingly connecting the first and second gears, and
drive gear housing the first gear, the second gear and the planet gears, and
a differential locking system comprising:
said drive gear including a generally cylindrical pin having a longitudinal axis parallel to the longitudinal axis of said pair of axles;
a slidable member slidably mounted on and rotatable with the first axle and lockable with the pin, and
an actuator connected to the slidable member wherein actuation of the actuator slides the slidable member into and out of engagement with the pin.

19. The driving apparatus of claim 18, wherein the first gear is a sun gear comprising a sleeve gear extending through to the drive gear.

20. The driving apparatus of claim 18, wherein the first axle comprises a sleeve gear extending through the drive gear and fixed relative to the first gear.

21. The driving apparatus of claim 20, wherein the sleeve gear is affixed to the first gear.

22. A driving apparatus comprising:
a pair of axles differentially connected;
a drive gear operably connected to the pair of axles;
a first gear rotatably fixed to a first of the pair of axles and positioned in the drive gear;
an extension rotatably connected to the first gear and extending external to the drive gear;
a sliding member mounted on the extension and lock engageable with the drive gear; and
a shaft rotatably mounted generally perpendicular to the first axle and connected to the sliding member, wherein rotation of the shaft slides the sliding member into and out of engagement with the drive gear.

23. A locking differential system for a hydrostatic transaxle having a pair of axles, the differential system comprising:
a differential assembly including
a bull gear having a central opening and a plurality of pin holes disposed around the central opening,
a cover connected to the bull gear forming a differential assembly housing,
a respective plurality of pins disposed in the pin holes and extending from the bull gear;
a sleeve slidably mounted on and rotatably fixed relative to a first of the pair of axles, the sleeve including a plurality of slots to releasably lock with the pins; and
a fork rotatably supported in the transaxle substantially perpendicular to the first axle, the fork rotatably engaging the sleeve, wherein rotation of the fork causes the sleeve to slide along the first axle thereby placing the sleeve into and out of engagement with the bull gear.

24. The system of claim 23, wherein the differential assembly comprises:
a plurality of planet gears in the differential assembly housing rotatably positioned on the pins; and
a pair of sun gears, including a first sun gear, operably positioned in the differential assembly housing and having a sleeve gear extending external to the bull gear and rotatably fixed to the first axle, wherein the sleeve is slidably mounted on and rotatably fixed to the sleeve gear.

25. The system of claim 23, wherein the pins are undercut to facilitate locking with the sleeve.

26. A locking differential system for a transaxle having a pair of axles, the differential system comprising:
a bull gear positioned parallel to and operably connected to the pair of axles, the bull gear having a central hole and a pair of pin holes diametrically positioned about the central hole;

two pins fixed in the pair of pin holes and extending from the bull gear;

a pair of planet gears rotatably positioned on the pair of pins;

a first sun gear rotatably mated to a first of the pair of axles and matingly engaging the pair of planet gears;

a sleeve gear extending from the first sun gear through the bull gear and matingly fixed to the first axle;

a sleeve slidably mounted on and rotatably fixed relative to the sleeve gear, the sleeve having a plurality of slots releasably lockable with the pair of pins; and an actuator arm rotatably engaging the sleeve, wherein actuation of the actuator arm slides the sleeve along the sleeve gear thereby placing the sleeve into and out of engagement with the bull gear.

27. A differential locking system for a differential assembly connecting a pair of axles, the system comprising:

an input gear;

a pin extending parallel to a first of the pair of axles, the pin fixed directly to the input gear; and a sleeve slidably mounted on and rotatably fixed relative to the first axle, the sleeve including a slot releasably lockable with the pin.

28. The system of claim 27, comprising a sleeve gear extending from the differential assembly and fixed to the first axle, wherein the sleeve is mounted on and rotatably fixed to the sleeve gear.

29. The system of claim 27, wherein the pin is undercut.

30. A differential locking system for a differential assembly connecting a pair of axles, the system comprising:

an input gear;

a pin extending parallel to a first of the pair of axles, the pin fixed to the input gear, wherein the pin is undercut; and a sleeve slidably mounted on and rotatably fixed relative to the first axle, the sleeve including a slot releasably lockable with the pin.

\* \* \* \* \*